United States Patent [19]

Beluzzi

[11] Patent Number: 5,317,959
[45] Date of Patent: Jun. 7, 1994

[54] COVER LOCK/SAFETY DEVICE IN A PRESSURE COOKER

[75] Inventor: Giancarlo Beluzzi, Ghedi, Italy
[73] Assignee: Aeternum S.r.l., Lumezzane, Italy
[21] Appl. No.: 986,972
[22] Filed: Dec. 8, 1992

[30] Foreign Application Priority Data

Dec. 12, 1991 [IT] Italy .................... M191U001086

[51] Int. Cl.⁵ .................... A47J 27/082; A47J 27/09
[52] U.S. Cl. .................... 99/337; 99/403; 220/316; 220/326
[58] Field of Search ............ 99/337, 342, 403; 220/316, 324, 326; 292/25, 45, 96, 122, 195, 207, 220

[56] References Cited

U.S. PATENT DOCUMENTS

| | | |
|---|---|---|
| 1,751,079 | 3/1930 | Schulz . |
| 2,566,008 | 8/1951 | Westby . |
| 2,614,722 | 10/1952 | Wyman .................... 220/316 |
| 3,876,104 | 4/1975 | Minsky .................... 220/326 |
| 4,103,801 | 8/1978 | Walker .................... 220/316 |
| 4,423,825 | 1/1984 | Baumgarten .................... 220/316 |
| 4,589,567 | 5/1986 | Pircher .................... 220/326 |
| 4,932,550 | 6/1990 | Moucha .................... 99/403 |

FOREIGN PATENT DOCUMENTS

4017067A1 11/1991 Fed. Rep. of Germany .
2326895 6/1977 France .................... 220/316

OTHER PUBLICATIONS

European Search Report. The Hague, Apr. 7, 1993, Examiner Schmitt J. W.

Primary Examiner—Philip R. Coe
Assistant Examiner—Terrence R. Till
Attorney, Agent, or Firm—Hedman, Gibson & Costigan

[57] ABSTRACT

The cover lock/safety device (1) of a pressure cooker (2) substantially comprises a cover handle (10) hinged onto the cover (3), which handle his formed by a first, hook-shaped element (16), and a second element (17) extending from the extension of said first, hook-shaped element. The first element (16) gets engaged in (12) to the side surface of the cooker body (4), tightly closing the said cover (2).

When the cooker operates, the inner pressure inside the cooker (2) pushes outwards a pin element (11) which, in said extended position, engages the free end of said second element (17). Thus, the handle (10) results to be locked when the cooker is under pressure. The device is hence easy to use and, simultaneously, safe.

18 Claims, 3 Drawing Sheets

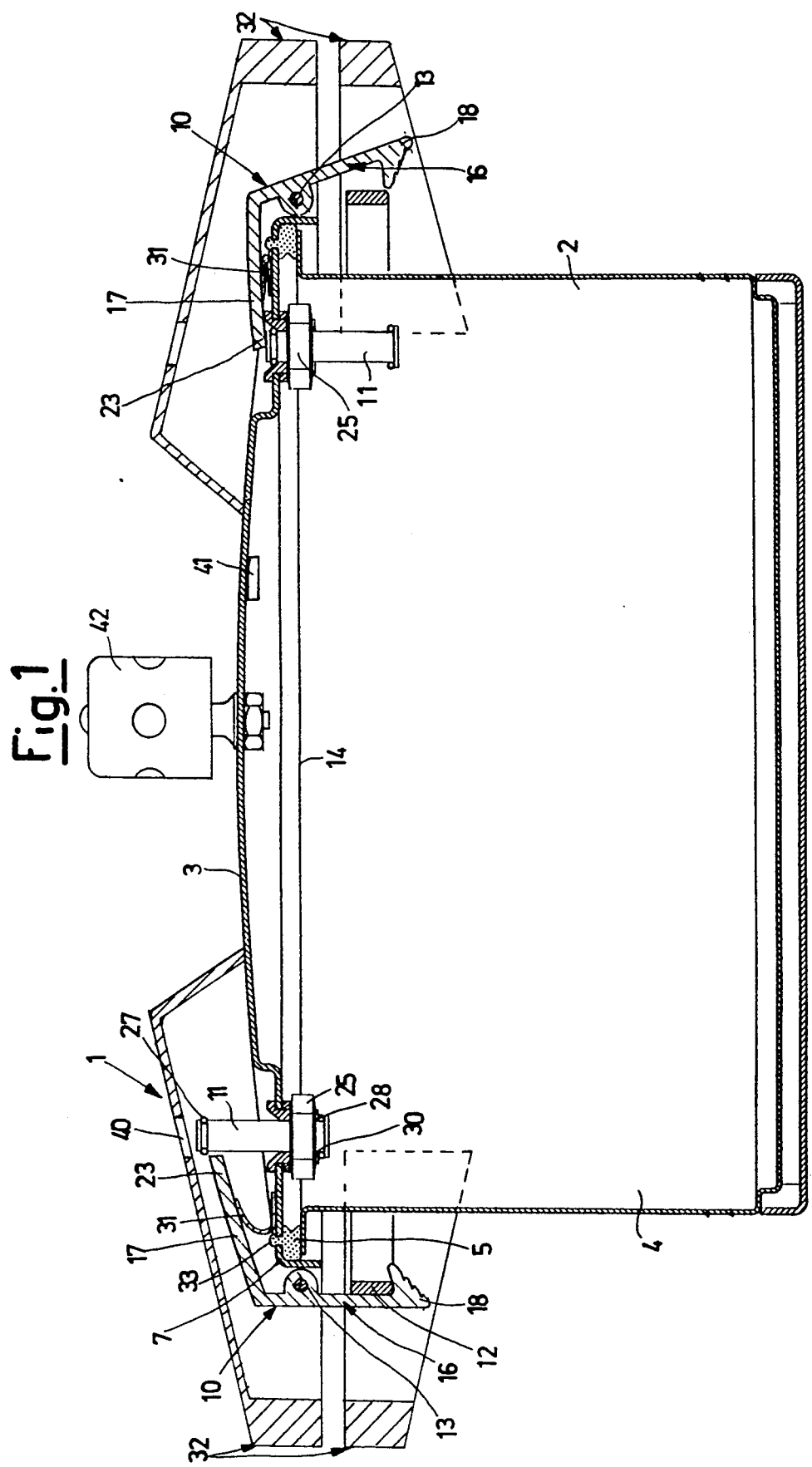

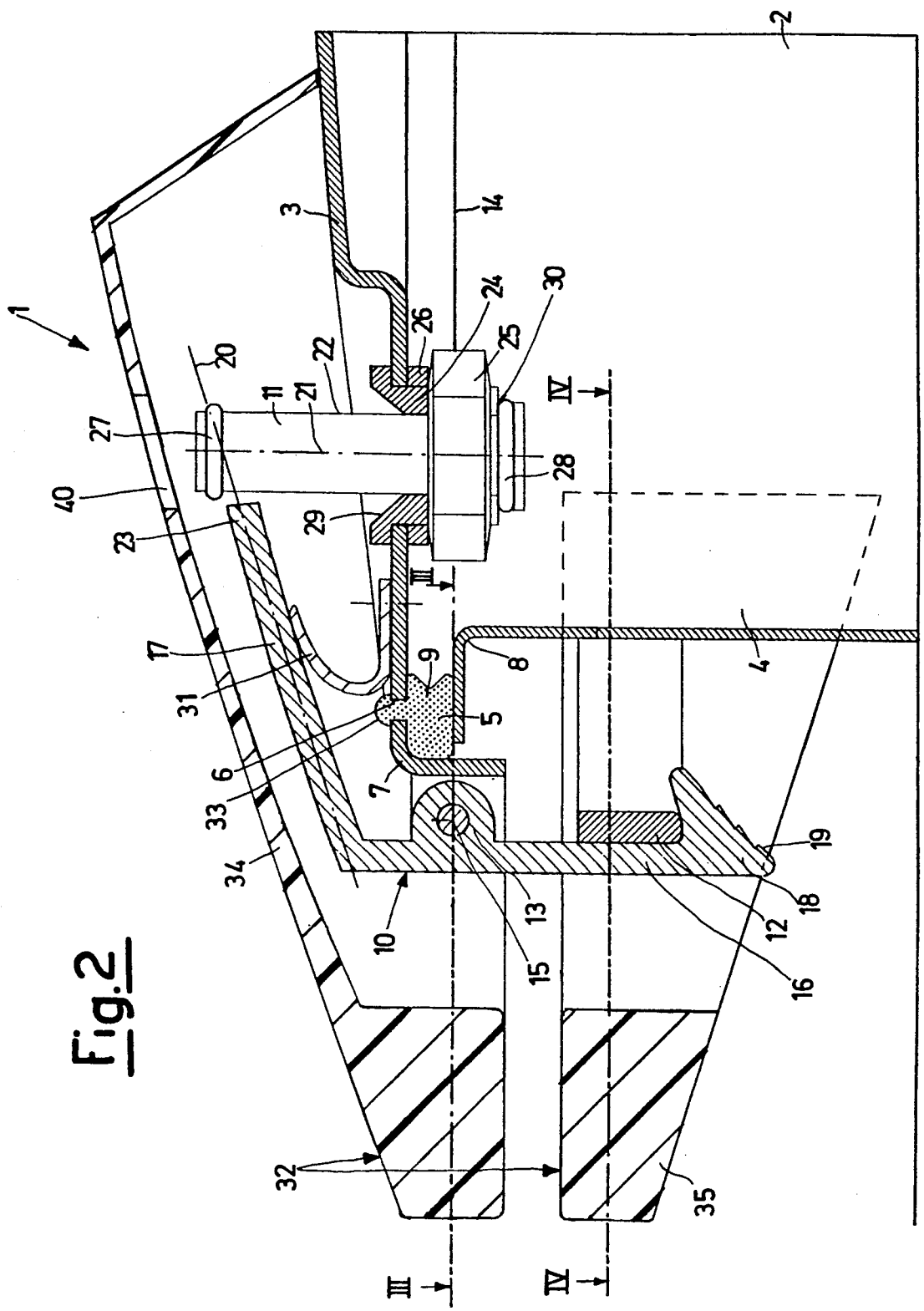

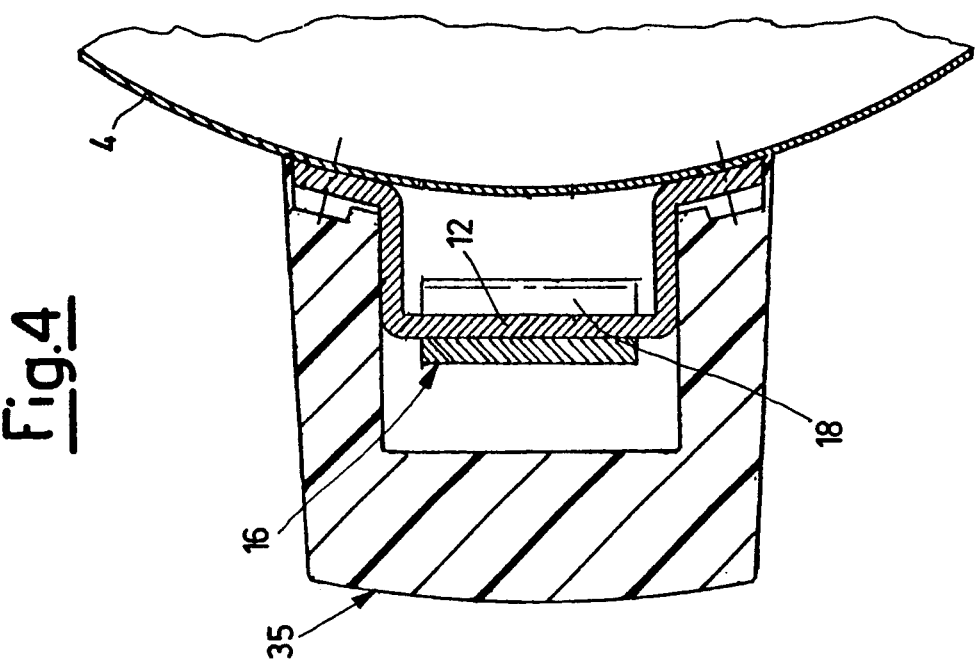
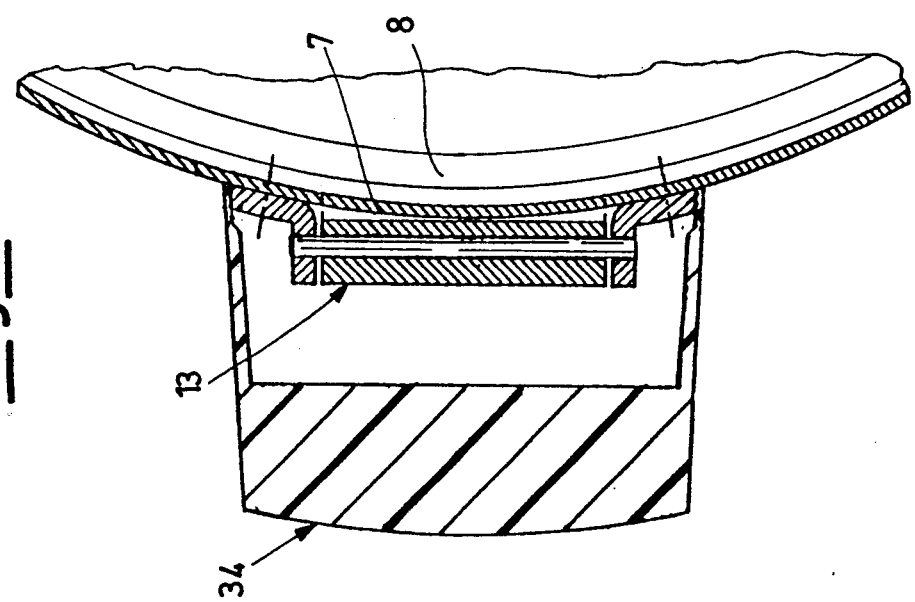

COVER LOCK/SAFETY DEVICE IN A PRESSURE COOKER

The subject-matter of the present invention is a cover lock/safety device in a pressure cooker.

The presently known devices comprise at least one handle hinged onto the cover according to an axis parallel to the plane on which the cover lays and a pin element, capable of sliding due to the effect of the pressure, from a first, retracted, position, to a second advanced position, in which said pin element protrudes outside the cooker, in order to disengage, and lock the handle, respectively.

Although the present safety devices are substantially safe for the users, even in the case of incautious users, they result to be poorly handsome for the average user, because the locking and opening operations, and, above all, the operations of removal and positioning of the cooker cover from/onto the cooker body, are complex.

The purpose of the present invention consists of providing a device which is capable of obviating the above said drawbacks, i.e., of providing a device which is simultaneously handsome and safe, so as to result particularly simple to use also for those users who are not very much familiar with pressure cookers.

Another purpose of the present invention is of providing a lock device which is structurally simpler than those as known from the prior art, to the advantage of manufacturing costs and reliability.

Such purposes are achieved by a device according to the first claim.

The finding is illustrated for merely exemplifying, non-limitative, purposes, in the figures of the accompaning drawing tables.

FIG. 1 is a sectional view of a cooker provided with a device according to the finding.

FIG. 2 is a magnified detail of FIG. 1.

FIG. 3 is a sectional view made along line III—III of FIG. 2.

FIG. 4 is a sectional view made along line IV—IV of FIG. 2.

Referring to the above said Figures, the cover lock-/safety device 1 in a pressure cooker 2 is installed on a cover 3 which is applied to a cooker body 4 in order to close the cooker with a pressure-tight seating being accomplished.

The cover 3 is equipped with the customary pressure regulator 42 and safety air vent 41.

The pressure tightness is secured by an endless-configuration gasket 5, preferably integral with the cooker cover 3 through a plurality of extensions 33 which engage through-bores 6 provided at the edge 7 of the same cooker cover 3.

The edge 7 of the cooker cover 3 has an "L"-shaped cross-section and contains the edge 8 of the cooker body 4, which also has an "L"-shaped cross-section. The edge 8 of the cooker body defines the plane on which the gasket lays, corresponding to the plane 14 on which the cover lays on the cooker body. The edges 7 and 8 are kept spaced apart from each other by the gasket 5 which is compressed upon cover 3 closure.

The gasket 5 has three substantially flat side surfaces, two of which rest against the edge 7, and the third of which engages the edge 8. On the contrary, the residual fourth surface is free, so that the gasket 5 can freely expand. Furthermore, the forth gasket surface is provided with a "V"-shaped groove 9 which favours said expansion or, anyway, deformability when said gasket is compressed between the edge of the cover and the edge of the cooker body.

As it may also be seen from the drawings, the device according to the present finding seats the cooker by completely operating from the outside and, in particular, without requiring any particular edge configurations. Therefore, the cooker body 4 can be similar to (or even it can be the body of) traditional pots, which are not pressure cookers, with a double use destination being consequently not excluded. In the case of use of a non-pressure-cooker pot, the cover may also be easily associated with a cover of slide-in type.

The device 1 substantially comprises a handle 10, a sideway protruding element 12, and a pin 11. The handle 10 comprises a first, hook-shaped element 16, and a second, flat element 17, which protrude on opposite sides relatively to the axis 15 of a hinge 13 which constrains the handle 10 onto the cover 3. The axis 15 is parallel to the plane 14 on which the cover lays; and in the particular case exemplified herein, the axis 15 lays on the plane 14. The first element 16 shows a free end 18 which is bent and hence, thanks to its shape, engages the second, sideway protruding, element 12.

According to a particular embodiment, the element 12 might possibly be the same handle of the cooker body 4, so as to provide one single element with double functionality.

On the free end 18, furthermore a portion 19 is provided, which is directed upwards and towards the cooker body, and preferably is roughened in order to facilitate grasping the handle 10, when the latter is pulled outwards in order to open the device 1, and consequently the cooker.

The second flat element 17 extends from the extension of the first element, according to a plane 20 incident not perpendicularly, towards the outside of the cooker, to the axis 21 of the pin element 11, up to reach, with its free end 23, the side surface 22 of said pin element 11, when the latter is in its advanced position, protruding towards the outside of the cooker. Between the second, flat element 17 and the cooker cover 3, elastic means are interposed—in the herein exemplified case, a flat spring 31, which, by substantially acting on the handle 10, normally keeps the latter in its locking position.

The pin element 11 slides inside a housing 24 provided inside an element installed of the cover 3 of the pressure cooker, and constrained to it through a nut 25, which compresses a gasket 26 which provides the tight seating between said element and the cover. The tightness between the ends of the sliding pin 11 and the seat 24 is secured by two O-ring gaskets 27 and 28.

The first O-ring gasket 27 prevents the sliding pin 11 from falling into the cooker when said sliding pin 11 is in its retracted position towards the interior of the cooker 2, by engaging a first conical surface 29. The second O-ring gasket 28 secures the tightness when the sliding pin 11 is in its advanced position protruding outwards from the cooker, by engaging a second conical surface 30; where each of said conical surfaces is respectively positioned at each end of seat 24.

The device 1 is preferably housed inside a sheltering housing 32, which can be constituted by a first portion 34 containing the elements 11 and 17, and a second portion 35 containing the elements 12 and 16 when the cooker is closed.

In particular, said first portion 34 prevents the sliding pin 11 from being freely accessed, preventing it from being easily neutralized, thus frustrating its protection task.

However, the first portion 34 of the sheltering housing 32 is provided with an opening, or bore 40, the axis of which coincides with the axis of the sliding pin 11. The bore 40 performs the double function of rendering visible and/or accessible the sliding pin 11. In the first case, owing to the sliding pin 11 being visible, the user can, as a function of its position, easily realize whether the device 1 is in its locked, or disengaged position. For that purpose, the pin 11, i.e., its side surface, could possibly also be provided with coloured stripes, so as to evidence the portions thereof which protrude outwards from the cooker.

In the second case, the accessibility of the pin enables the user to act on it in order to neutralize its action, in the case in which, owing to operating anomalies, should the pin get jammed in its position of engagement with the free end 23 even if inside the interior of the cooker no pressure exists. For that purpose, it is not necessary that the bore 40 has a larger diameter than of the pin 11 as, on the contrary, is illustrated in FIG. 2, for the purpose of rendering the pin 11 also visible owing to the already said reasons, but said bore may also be of much smaller diameter than of said pin 11.

In the case in which the bore 40 has a much shorter diameter, the cooker can be possibly fitted with a tool, or pin, not illustrated, to be inserted through the small-diameter bore 40, in order to unlock the pin 11, by pushing it towards the interior of the cooker. Such a structure would surety prevent undesired actions of the pin 11 because, owing to the small size of bore 40, it would be invisible for the users.

The second portion 35 constitutes, in the herein exemplified case, a cooker body handle 4.

In the case exemplified herein, the device 1 operates associated with another, identical, diametrically opposite, device. The possibility of providing even more than two devices arranged along the circumference of the cover 3 is not excluded. Such a possibility could occur above all when cookers have to be closed, having a larger diameter than of the cooker as normally used by a family.

Furthermore, one of both devices 1 arranged on a same diameter could be possibly replaced by a hinge, possibly of the type which can be dismantled when the cover is in its open position.

The device 1 operates as follows.

After charging the food to be cooked to the cooker, in order to close the latter it is enough that the cover 3 is superimposed onto the cooker body 4, so that each portion 19 of the first elements 16 comes to rest on the relevant sideways protruding element 12, and that thereafter a pressure is applied. By applying a pressure to the cover, every hook-shaped element 16 gets hooked to the relevant sideways protruding element 12, by overcoming the elasticity of the spring 31, which remains pre-loaded. During the cooking step, the internal pressure inside the cooker pushes the sliding pin 11 and causes it to protrude outwards from the cooker 2, and the sliding pin 11 reaches a very near position, with its external end, to the free end 23 of the second, flat element 17. The O-ring gasket 28 engages the second conical surface 30, providing the hydraulic tightness. Should and imprudent user try to open the cooker by acting, as provided for, on the flat portion 19, the rotation of the handle 10 around the axis 15 is prevented, because the free end 23 of the second, flat element 17 urges against the pin 11.

Furthermore, the first portion 34 of the sheltering housing 32 prevents such an imprudent user from succeeding to press the pin element 11 into the interior of the cooker, thus neutralizing said pin element locking action provided for safety purposes.

When the cooking is ended and the internal cooker pressure is vented off through the opening of the traditional pressure regulator 42, the pin 11 automatically returns, by gravity, back to its retracted position, thus disengaging the free end of the second, flat element 17. By pulling outwards the first hook-shaped element 16 by acting on the flat portion 19, said element 16 disengages the element 12.

I claim:

1. A pressure cooker including a body, cover and a lock/safety device (1) (2) said lock safety device, comprising at least one handle (10) hinged onto said cover (3) in a hinging axis (15) which is parallel to a plane (14) in which the said cover (3) lays and said cover (3) being provided with at least one pin element (11) placed in a housing (24) in said cover (3) and slides outwardly from said cover (3) when said cooker is under pressure, from a first retracted position to an outward protruding position from said cooker (2) along a sliding axis (21), to lock the handle (10), said handle (10) comprising, on opposite sides relative to said hinging axis (15), a first, hook-shaped element (16) and a second, flat element (17), said first, hook-shaped element (16) having a free bent end (18) which hooks, under closure conditions, into a sideways protruding element (12) which protrudes outwardly from the cooker body (4), said second, flat element (17) being connected to an end of said first element (16) to form an obtuse angle with said sliding axis (21) of the pin element (11), said second flat element having a free end (23) which extends up to the side surface of said pin element (11) when said pin element is in an outward protruding position from said cooker (2) to prevent removal of said cover.

2. A pressure cooker according to claim 1, characterized in that said element (12) which protrudes sideways from the cooker body (4), is a portion of the handle of said cooker body.

3. A pressure cooker according to claim 1, characterized in that said first hook shaped element has a bent free end (18) which is provided with a roughened surface (19) which is angled to the cooker body (4).

4. A pressure cooker according to claim 1, characterized in that said first, hook-shaped element (16) is held in a position of engagement with said sideways protruding element (12) which is provided on the outside of the cooker body (4) by a spring (31).

5. A pressure cooker according to claim 4, characterized in that said spring (31) is a flat type of spring and is interposed between the second flat element (17) of the handle (10) and the cover (3).

6. A pressure cooker according to claim 1, characterized in that an edge (7) of the cover (3) has an "L" shaped cross-section and contacts an edge (8) of the cooker body (4), said edge (8) of said cooker body (4) having an "L" shaped cross-section, and having between said edges (7,8) a compression-operating gasket (5).

7. A pressure cooker according to claim 6, characterized in that said gasket (5) is integral with said cover (3)

through extensions (33) which engage throughbores (6) which extend through the cover (3).

8. A pressure cooker according to claim 6, characterized in that said gasket (5) has an endless configuration, having a first flat side surface and a second flat side surface resting against said "L"-shaped edge (7) of the cover (3), a third, flat side surface resting against said edge (8) of the cooker body (4), and a fourth surface thereof which is free expand and is provided with a "V"-shaped groove.

9. A pressure cooker according to claim (1), characterized in that said pin element (11) slides through a seat (24) to become fastened, under tightly sealing conditions, onto said cover (3) said seat comprising a first conical surface (29), suitable for engaging a first O-ring gasket (27) on an external end of said pin (11) which prevents said pin (11) from falling into the cooker and said seat having a second conical surface (30) suitable for engaging a second O-ring gasket (28) provided on an internal end of pin element (11).

10. A pressure cooker according to claim 9, characterized in that said seat (24) is housed inside an element fastened by means of a nut (25), which contacts a gasket (25).

11. A pressure cooker according to claim 1, characterized in that said handle is placed inside the interior of a sheltering housing (32).

12. A pressure cooker according to claim 11, characterized in that said sheltering housing is provided with a bore hole (40), which is coaxial with the axis of pin element (11).

13. A pressure cooker according to claim 12, characterized in that the diameter of said bore is larger than the diameter of said pin element (11).

14. A pressure cooker according to claim 12, characterized in that the diameter of said bore is smaller than the diameter of said pin element (11).

15. A pressure cooker according to claim 11, characterized in that said sheltering housing (32) comprises a first portion (34) and a second portion (35), the first portion (34) enclosing the pin (11), the second, flat element (17); and the second portion (35) enclosing the first, hook-shaped element (16).

16. A pressure cooker according to claim 15, characterized in that said second portion (35) of said sheltering housing (32) is a portion of handle of the cooker body (4).

17. A pressure cooker according to claim 11, characterized in that said sheltering housing (32) is made of a thermally insulating material.

18. A pressure cooker according to claim 1 wherein there are two handles.

* * * * *